(12) United States Patent
Stevens

(10) Patent No.: US 8,856,837 B2
(45) Date of Patent: Oct. 7, 2014

(54) LOCATION-BASED TUNER

(75) Inventor: J. Clarke Stevens, Littleton, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 842 days.

(21) Appl. No.: 12/826,862

(22) Filed: Jun. 30, 2010

(65) Prior Publication Data

US 2012/0002115 A1    Jan. 5, 2012

(51) Int. Cl.
*H04N 7/18* (2006.01)
*H04H 20/71* (2008.01)
*H04H 60/09* (2008.01)
*H04W 4/00* (2009.01)
*H04N 5/50* (2006.01)
*H04N 21/422* (2011.01)
*H04N 21/438* (2011.01)

(52) U.S. Cl.
CPC ........... *H04N 5/50* (2013.01); *H04N 21/42202* (2013.01); *H04N 21/4383* (2013.01)
USPC ......... 725/74; 455/3.01; 455/3.03; 455/422.1

(58) Field of Classification Search
USPC ............................................................ 725/74
See application file for complete search history.

(56) References Cited

U.S. PATENT DOCUMENTS

| | | | |
|---|---|---|---|
| 6,181,921 B1 * | 1/2001 | Konisi et al. | 455/186.2 |
| 6,295,294 B1 * | 9/2001 | Odlyzko | 370/389 |
| 6,362,778 B2 * | 3/2002 | Neher | 342/357.75 |
| 7,352,710 B1 * | 4/2008 | Panburana et al. | 370/282 |
| 8,081,938 B2 * | 12/2011 | Ishida | 455/185.1 |
| 2006/0160570 A1 * | 7/2006 | Kamarainen | 455/557 |
| 2007/0300252 A1 * | 12/2007 | Acharya et al. | 725/25 |
| 2009/0205000 A1 * | 8/2009 | Christensen et al. | 725/61 |
| 2010/0203823 A1 * | 8/2010 | Apaar | 455/3.06 |
| 2011/0141375 A1 * | 6/2011 | Yuen et al. | 348/731 |

* cited by examiner

*Primary Examiner* — Ricky Chin
(74) *Attorney, Agent, or Firm* — Great Lakes Intellectual Property, PLLC.

(57) ABSTRACT

A method and system of facilitating tuning to content and/or signal streams, including capabilities to facilitate tuning when traveling from one geographical location to another where the different geographical areas may be rely on different identifiers to facilitate locating the content and/or signaling of interest.

15 Claims, 2 Drawing Sheets

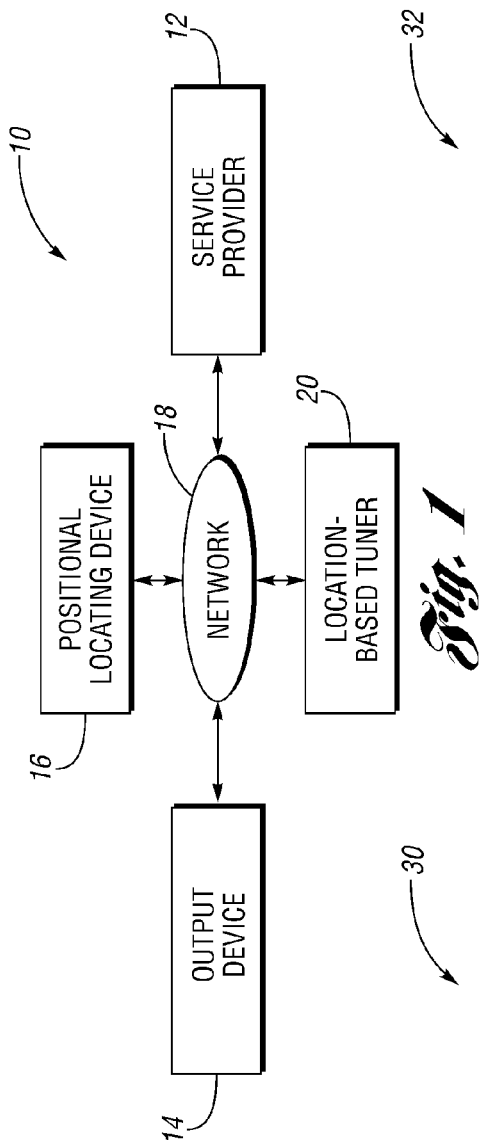

LOCATION-BASED TUNER

TECHNICAL FIELD

The present invention relates to geo-location related methods and systems for tuning to particular programs or content sources in a consistent way regardless of location.

BACKGROUND

A television program is typically tuned to by a user providing a channel number to an output device, such as through interaction with a channel map or simply by inputting the channel number. A channel map cross-references the provided channel number to a channel name, such as but not limited to a network name, like ABC, ESPN, ESPN2, to a channel number, like 1, 4, 7. Some geographical areas use different channel maps in that the channel name in one geographical area may be mapped to a first channel number while the same channel name is mapped to a second, different channel number in another geographical area. This can be problematic to a user traveling between those geographical areas in the event the user inputs a certain channel number thinking it corresponds with the channel name of interest when it is actually mapped to another channel name due to the new geographical area being supported with a different channel map.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

FIG. 1 illustrates a system for location-based tuning in accordance with one non-limiting aspect of the present invention;

FIGS. 2-3 illustrate channel maps in accordance with one non-limiting aspect of the present invention.

DETAILED DESCRIPTION

Figure 4:
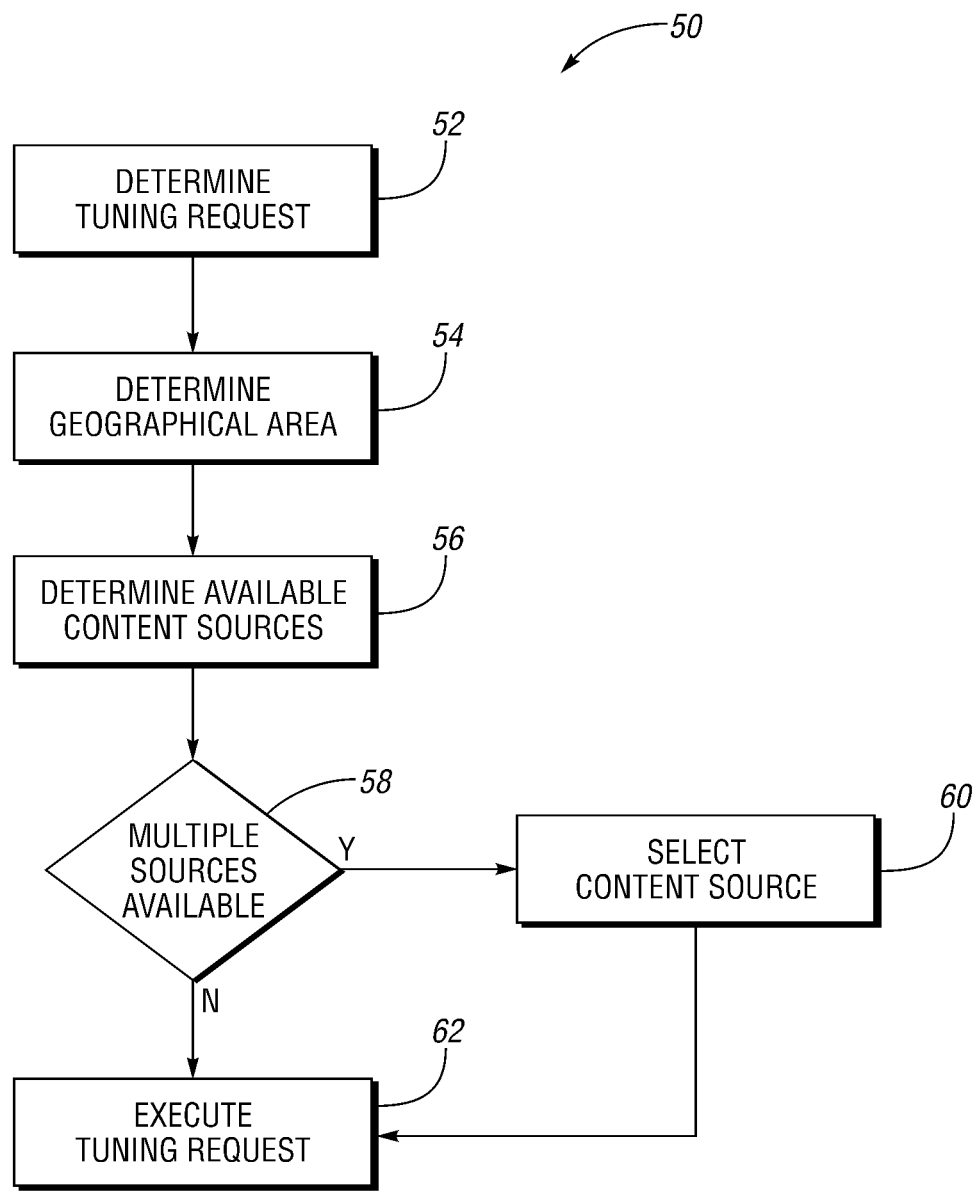
FIG. 4 illustrates a flowchart of a method of location-based tuning in accordance with one non-limiting aspect of the present invention.

FIG. 1 illustrates a system 10 for location-based tuning in accordance with one non-limiting aspect of the present invention. The system includes a service provider 12 operable to provide media content related services to an output device 14 and a positional location device 16 operable to facilitate locating a geographical area of the output device 14. Communications between the output device 14, locating device 16, and service provider 12 are carried out over a network 18. FIG. 1 illustrates a single output device 14, positional locating device 16, service provider 12 and network 18 for exemplary purposes. The present invention fully contemplates its application with any number of such devices 12, 14, 16 and with communication therebetween carried out over wireline, wireless, or a combination of wireless and wireline systems 18.

The service provider 12 is predominately described with respect to supporting television related services, such as but not limited to the playback of linear and non-linear television programs, movies, etc., that are either transmitted to the output device 14 with signaling streams originating from the service provider 12 or from some other entity within the control or domain thereof. The service provider 12 may be operable to transport or facilitate transport of related signaling streams as IP type signaling streams identifiable with an IP address or URL, MPEG based signaling streams identifiable at a designate frequency or channel number (the output device may include a tuner), FDMA or CDMA based signaling used by cellular phone network, satellite, WiMax, or other transmission networks yet to be developed. For exemplary purposes, the addressing or other information necessary to tune to or to otherwise access the signal streams are referred to as channels or television channels having a channel number or other form of address. This is done for the sake of simplifying the explanation and without intending to limit the scope and contemplation of the present invention to television channels or related services.

The output device 14 is contemplated to be any type of output device 14 having capabilities to interface media content directly with a user and/or with a viewing device or other element associated with the user. Exemplary output devices 14 include but are not limited to settop boxes (STBs), media terminal adapters (MTAs), mobile phones, mobile computers, personal digital assistants (PDAs), televisions, etc. The signaling associated with the service provider 12 may be adapted to the signaling capabilities and other restrictions (e.g., video formatting, codec, protocol, etc.) of the output device 14.

The positional locating device 16 is contemplated to be any type of device having capabilities to generate positional coordinates, such as but not limited to Global Positioning Coordinates (GPS), and/or to otherwise facilitate identifying a current geographical area of the output device. This may be done, for example, by triangulating the positioning of the output device through related signaling, in which case the positional locating device may be part of the output device and/or a device carried on the person of the user, by cross-reference addressing used to electronically communicate with the output device based on known positional coordinate of intermediary devices used to communicate therewith, and/or through any type of other positional locating operation and means.

One non-limiting aspect of the present invention contemplates the system 10 having a location-based tuner 20 operable to facilitate location-based tuning of the output device 14. The location-based tuning corresponds with the location-based tuner 20 operating in cooperation with the positional locating device 16 to adjust tuning requests according to a current geographical location of the output device 14. In the event the user travels with the output device 14 from a first geographical area, such as the geographical area of the user's home, to a second geographical area, the channel names and channel numbers corresponding with the first geographical area may not correspond with the second geographical area. The location-based tuner 20 can correlate the mapping discrepancies and provide tuning assistance.

The location-based tuner 20 is shown to be separate from each of the output device 14, positional locating device 16, and service provider 12. The operations and other functions contemplated to be performed by the location-based tuner 20 may be wholly or partially integrated within one or more of the illustrated devices 12, 14, 16. The location assistance provided by the location-based tuner 20 may be added to the output device 14 such that the output device 14 may be capable of providing assistance. The location-based tuner 20 may also be a standalone network-based element capable of facilitating tuning of any number of output devices 14 having capabilities to communicate therewith. Regardless of its location, at least one non-limiting aspect of the present invention contemplates the location-based tuner 20 facilitating tuning operations of the type where some discrepancy may occur between the tuning the user is accustomed to and the tuning required for the current geographical area or communication capabilities of the output device 14.

The channel number and channel name discrepancies can occur, for example, in the event the output device 14 is attempting to access media services from a different service provider 12, in the event the same service provider 12 relies on a different channel number or channel name correlations in each of the first and second geographical areas, and in the event the user travels to a new geographical area, in which case the output device 14 may travel with the user or the user may be attempting to access services from a different output device 14. The geographical boundaries or demarcation between the first and second geographical areas may correspond with any boundary, either of the physical type, such as were different service providers 12 are allocated to different physical areas of service, or of an electronic type, where different service providers 12, and in some cases, the same service provider 12, may be capable of communicating over different channel numbers or other addresses depending on the medium through which the services are being accessed.

FIGS. 2-3 illustrate channel maps 30, 32 used in the first and second geographical areas in accordance with one non-limiting aspect of the present invention. A first channel map 30 corresponds with the first geographical area and the second channel map 32 corresponds with the second geographical area. The first channel map 30 includes a name column 34 listing channel names and first and second number columns 36, 38. The first number column 36 illustrates television channels for each channel name of a first service provider servicing the first geographical area and the second number column 38 illustrates alternative address for each channel name 34. The alternative addresses 38 correspond with medium of communication other than that used to transmit the television channels 36 broadcast, cable, or satellite television service providers 12.

The alternative addresses 38, for example, may correspond with IP address, URL addresses, cellular address, WIFI addresses, and the like that are suitable to facilitate non-television related transmission of the media content, optionally from the first service provider 12 or some other provider 12 having the ability to communicate with the output device, such as a hotel DVR or private entertainment system that may communicate over a local wireline or wireless network; a geographically unbound, web-based content source; and a local cellular or wireless telephone or telephony service provider. While only one column of television channels 36 and one column of alternative addresses 38 are shown, any number of additional columns may be similarly included for each content source 12 having capabilities to support transmission of the noted channel names to the output device.

The second channel map 32 similarly includes a name column 42 for listing the channel names available within the second geographical area and first and second number columns 44, 46 for listing corresponding channel number of first and second service providers available within the second geographical area. Unlike the first channel map 30, only channel numbers are listed in the second channel map 32 to represent another application of the present invention where multiple television service providers 12 are able to communicate with the output device 14, which optionally may require the output device 14 to tune to different television networks or to otherwise establish different network type connections, e.g., the first service provider channel 44 may be available through a wireline connection to the output device 14 while the second service provider channels 46 may be available through a different, wireless connection. The first and second channel maps are intended to represent, for exemplary purposes, different schemes for cross-reference television channel names available within a particular area with the channel numbers or other addresses used by service providers capable of servicing the particular area to transmit the content of the corresponding channel name.

FIG. 4 illustrates a flowchart 50 of a method of location-based tuning in accordance with one non-limiting aspect of the present invention. The method may be implemented wholly or partially according to operations executed or otherwise facilitate by the location-based tuner 20. For exemplary purposes, the method is predominately described with respect to tuning to television channels. The use of television channels is intended only to reflect one arrangement of identify and accessing signal streams carrying content and is not intended to limit the method of the present invention to television channel tuning or to television related servicers. The method of the present is particular advantageous in easing user access to any type of media content where the media content may be accessed through different mechanisms, networks, interfaces, .etc. in different physically or electrically disparate areas.

Block 52 relates to determining a tuning request. The tuning request may relate to any request by the user to access media content through the output device 14 or with the assistance of the output device 14. For exemplary purposes, the tuning request is described with respect to a television related event where the user desires to tune to or otherwise access content carried over at particular television channel of interest. The location-based tuner 20 may determine the tuning event from communication received from the output device 14, such as in response to user input thereto, or in the case of the location-based tuner being part of the output device 14, in response to user inputs directly to the location-based tuner 20.

One aspect of determining the tuning request may include assessing the channel number needed to be tuned to by the output device 14 from user inputted information other than the actual channel number, which the user is unlikely to know if the user is in a different geographical area having a channel map that differs from their home geographical area. The tuning request may identify the content or channel of interest by its name, such as but not limited to input of the name associated with the source of the content (e.g., ESPN, ABC, etc.). Optionally, if the name of the channel is not know but a program airing on the channel is known, the channel name may be determined from input of the program name instead. Yet another option may allow the user to identify the channel of interested by inputting the channel number associated with their home location, which may then be cross-referenced to the desired channel number.

Optionally, the tuning request may be automatically determined from operations of the output device 14 or non-user specific operations, such as when the output device 14 requests tuning due to an inability to continue to receive the desired content over the currently tuned to channel, e.g., when traversing a boundary between a first geographical area and a second geographical area where the second geographical area carries the desired content on another television channel or through an alternatively delivery system. In some cases the user may not be operating the output device, for example, the tuning request may related to a message or other inquiry made to determining the channel number corresponding with a particular channel of interest, such as if the user transmits an email or text message to request the channel number for an inputted channel name.

Block 54 relates to determining a geographical area of the output device 14 through which the tuning request is to be completed. The geographical area may correspond with the physical location of the user and/or the output device 14, i.e., in the event the output device 14 is in a different geographical area than the user, the location of the output device 14 and not the user may be determined. The location-based tuner 20 may determine the geographical area according to geographical coordinates provided by the positional locating device 16 and/or through coordinates previously associated with the location of the output device 14 of interest. The geographical area may be constantly or periodically monitored to track the current positioning of the output device 14, such as to facilitate continuous access while the output device 14 is actively traveling between different geographical areas.

Block 56 relates to determining content sources 12 available in the determined geographical area. The content sources 12 correspond with any source 12 having the capabilities to transmit the content of a particular television channel to the output device 14. One available content source 12 may use a cable television system that transmits the content over television channels while another available content source 12 may use satellite, WIFI, private networks (hotel or home network), or cellular/mobile phone networks that transmit the content over other types of signal streams that can be identified by channel number or other addressing options. The available content sources 12 may be filtered according to the capabilities of the output device 14 to interact with the associated content sources 12. Content sources 12 that are unable to deliver the content according to the codec or protocol of the output device 14 may be eliminated from the content sources 12 determined to be available.

Block 58 relates to assessing whether multiple content sources available within the given geographical area for the content of interest. A selection process is conducted in Block 60 if multiple content sources 12 are available. The selection process may be implemented with or without user interaction/selection of the content source 12. One selection process may relate to selecting the least expensive of the available sources 12 to provide the content. This cost may be assessed according to transmission costs, such as cost per bit of data need to support access, and user subscription costs, such as if the user is required to pay more for one source 12 than the other. The costs may be determined ahead of time, such as part of the user's subscription purchase and/or anew depending on the desired content and available sources 12, such as by the location-based tuner 20 communication messages or otherwise facilitating electronic cost inquires to the available sources 12. Another selection process may related to selecting the content source 12 having the highest quality, such as by assessing the communication mediums required for each source 12 and identifying the one having the highest quality output and/or the most reliable output.

The content sources 12 may be selected automatically or through user inputs. The user may specify operational settings or default setting such that the content source 12 meeting one of the above-identified criteria is automatically selected over the others without requiring user confirmation. The user may also be presented with a graphical user interface (GUI) or the other presentation portal through which the available content sources 12 can be listed for selection by the user.

In the event the desired content source 12 is selected or there is only one content source available, the tuning of the output device may be in executed in Block 62. The execution of the tuning operation may be automatically completed in a manner that is transparent to the user, such as to allow for seamless and continuous presentation of content while traveling from one geographic location to another where the channel must be changed to maintain uninterrupted access or viewing.

As supported above, one non-limiting aspect of the present invention relates to tuning to particular programs or content sources in a consistent way regardless of location. One non-limiting aspect of the present invention may rely on a database and geo-location to determine local parameters for locating content. For example, a computer or "portable" set-top box could identify (using GPS, for example) that it is located in Atlanta. It could then identify that it is on a Cox cable plant and could therefore determine that ESPN is on digital channel 75.1 and the local NBC affiliate is on channel 9.1 or available at a particular URL. This might be particularly useful for finding over-the-air broadcast channels in different locations. When traveling, it may be difficult to find the particular local channel for a particular service. Using a pre-loaded database or an online database in conjunction with location and other identifying information, the source can be found and presented with little or no user interaction. As the location changes, the source can be updated to tune the most powerful signal. If the neighboring regions overlap, the signal may be able to transition without interruption. One such application would be for broadcast television signals that are national in nature, but carried by different local channels, where a user can enter a user-friendly channel identifier (such as CNN), then be automatically tuned to the right channel number for that location. Also, the user can cross region boundaries and have the channel number automatically updated to the new area.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention. The features of various implementing embodiments may be combined to form further embodiments of the invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for tuning to one of a plurality of television channels carrying a live television program to different geographical areas, wherein a first channel of the plurality of television channels transmits over a first communication medium and a second channel of the plurality of television channels transmits over a second communication medium, the first communication medium being an alternative delivery system to the second communication medium, the method comprising:

identifying a geographical area of an output device associated with a recipient desiring to tune to the live television program according to geographical information collected from a positional locating system;

determining a first channel map used within the geographical area, the first channel map cross-referencing a plurality of first channel numbers with one of a plurality of first channel names;

determining a subscription associated with the recipient;

determining a second channel map associated with the subscription, the second channel map cross-referencing a plurality of second channel numbers with one of a plurality of second channel names;

determining a tuning request from the recipient to tune to a particular channel number, the particular channel number being identified as one of the plurality of second channel numbers specified in the second channel map;

instructing tuning of the output device to the one of the first channel and the second channel being used to transmit the live television program to the identified geographical area, including relating the particular channel number to a corresponding one of the first channel numbers, the tuned to one of the first channel and the second channel being tuned to at the corresponding one of the first channel numbers; and wherein the first communication medium is a cable television network and the second communication medium is a cellular phone network.

2. The method of claim 1 further comprising instructing tuning of the output device to the one of the first and second channels having an associated codec operable with a codec of the output device.

3. The method of claim 2 further comprising, in the event the codec of both the first channel and the second channels are operable with the codec of the output device, instructing tuning of the output device to the one of the first and second channels having at least one of a lower cost and a higher quality.

4. The method of claim 3 further comprising
determining the lower cost as a function of at least on of
(i) the subscription associated with the recipient that specifies costs for tuning to each of the first channel and the second channel;
(ii) an inquiry made to a provider of each of the first channel and the second channel;
(iii) a transmission cost associated with carrying signaling over each of the at least two of the television channels between sources used to source each of the first channel and the second channel and the output device; and
determining the higher quality as a function of quality associated with at least one of a transmission medium and a transmission protocol associated with carrying signaling over each of the at least two television channels.

5. The method of claim 3 further comprising initially instructing the output device to tune to a wireline connection when tuned to the first channel and to tune to a wireless connection when tuned to the second channel.

6. The method of claim 5 further comprising instructing the output device to tune to Moving Pictures Expert Group (MPEG) signaling when tuned to the wireline connection and to tune to one of Frequency Division Multiple Access (FDMA) signaling and Code Division Multiple Access (CDMA) signaling when tuned to the wireless connection.

7. The method of claim 6 further comprising instructing the output device to an address associated with the one of the first channel and the second channel, the address being one of an Internet Protocol (IP) address, a Universal Resource Locator (URL) address, a cellular address, and a Wi-Fi address.

8. The method of claim 2 further comprising, in the event the codec of the first and second channels are both operable with the codec of the output device, instructing tuning of the output device to the one of the first and second channels selected through a user interface displayed on the output device, the user interface listing each of the second channels numbers and the second channel names for selection according to ordering specified in the second channel map as opposed to ordering specified in the first channel map associated with the geographical area.

9. The method of claim 1 further comprising at least periodically re-evaluating the geographical information collected from the positional location system, and in the event the geographical area changes to a new geographical area, instructing tuning to a new one of the plurality of television channels being used to transmit the live television program to the new geographical area, including relating the particular channel number to a corresponding one of a plurality of third channel numbers specified in a third channel map associated with the new geographical area, the third channel map cross-referencing the plurality of third channel numbers with one of a plurality of third channel names, the new one of the plurality of television channels being turned to at the corresponding one of the third channel numbers.

10. The method of claim 1 further comprising at least one of:
identifying the live television program desired to be tuned to by the recipient as a function of recipient inputs to the output device;
the output device communicating information reflective of the user inputs remotely to a controller in possession of the first channel map and the second channel map, the controller relating the particular channel number to a corresponding one of the first channel numbers.

11. The method of claim 1 further comprising determining the geographical information at least based in part on communications conducted between the positional locating system and a portable positioning device that travels with the recipient and is not included as part of the output device and that is not in communication with the output device.

12. The method of claim 1 further comprising determining the geographical information at least based on part on a known geographical area previously associated with to the output device.

13. A method of identifying channel numbers when different channel numbers are used in different geographical areas for the same channel names, the method comprising:
determining a geographical area of an output device as a function geographical information collected from a positional locating system;
determining a requested channel requested to be output from the output device according to a first channel identifier identified within a first channel map presented through the output device, the first channel map being associated with a home location identified within a subscription of a user requesting the requested channel; and
instructing the output device to tune to a tuned channel, including identifying both of a first channel and a second channel to be used within the geographical area, wherein the first channel is carried over a cable television network and the second channel is carried over a cellular phone network, and relating the first channel identifier to a second channel map associated with the geographical area whereby the tuned channel is determined to be one of the first and second channels identified within the second channel map having a second channel identifier corresponding with the first channel identifier, the tuned channel being different from the requested channel due to the first channel map corresponding with the home location and not the geographical area.

14. A location-base tuner operable to:

identify a location of an output device from geographical information associated therewith;

present a first channel map through the output device, the first channel map being part of a cable television network in another location other than the location;

identify a name of content to be accessed through the output device from user inputs made to the output device during presentation of the first channel map;

determine a second channel map associated with the location without presenting the second channel map to the user, the second channel map being part of a cellular phone network;

instruct the output device to tune to an address specified within the second channel map for the name, the address specified in the second channel map being different from an address specified in the first channel map for the name, wherein the tuned to address represents a television channel number when the identified location is a first location and the tuned to address represents an Internet Protocol (IP) address when the identified location is a second location.

15. The location-based tuner of claim 14 further being operable:

determine the first channel map based on a subscription of the user; and to instruct the output device to tune to a new address specified within a third channel map for the name in the event the geographical information indicates the output to device to have moved to a new location, the new address specified in the third channel map being different from the address specified in the first channel map and the address specified in the third channel map for the name.

* * * * *